United States Patent
Suzuki et al.

(10) Patent No.: US 7,412,137 B2
(45) Date of Patent: Aug. 12, 2008

(54) OPTICAL POWER MONITOR

(75) Inventors: Masaru Suzuki, Mohka (JP); Masahiro Ao, Tochigi (JP); Takeshi Fukuyama, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/682,575

(22) Filed: Mar. 6, 2007

(65) Prior Publication Data
US 2007/0230872 A1 Oct. 4, 2007

(30) Foreign Application Priority Data
Mar. 15, 2006 (JP) .............................. 2006-070967
Sep. 28, 2006 (JP) .............................. 2006-265106

(51) Int. Cl.
*G02B 6/26* (2006.01)
(52) U.S. Cl. .......................................... 385/48; 385/39
(58) Field of Classification Search .................... 385/39, 385/48, 29
See application file for complete search history.

(56) References Cited

U.S. PATENT DOCUMENTS

| 4,076,375 | A | 2/1978 | Muska et al. |
| 4,475,789 | A | 10/1984 | Kahn et al. |
| 5,500,913 | A | 3/1996 | Allen et al. |
| 6,535,671 | B1 | 3/2003 | Poole et al. |
| 6,603,906 | B2 * | 8/2003 | Qin et al. ...................... 385/48 |
| 7,065,284 | B2 | 6/2006 | Ao et al. |
| 2003/0174962 | A1 | 9/2003 | Poole et al. |

FOREIGN PATENT DOCUMENTS

JP 2003-329862 11/2003

* cited by examiner

*Primary Examiner*—Quyen P Leung
(74) *Attorney, Agent, or Firm*—Sughrue Mion, PLLC

(57) ABSTRACT

An optical power monitor capable of being reduced in size even when designed as a multi-channel monitor, and having a reduced light transmission loss is disclosed. The optical power monitor has two optical fibers provided on the light transmission upstream and downstream sides and having cores, the end surfaces which are opposed to each other with the core optical axes offset from each other, and which are fusion-spliced to each other in a fusion splicing portion, a light reflection surface which faces a portion of the upstream-side optical fiber core end surface offset to protrude from the downstream-side optical fiber core end surface in the fusion splicing portion, and which is provided in the downstream-side optical fiber cladding layer, and a photo-diode positioned opposite from the light reflection surface with respect to the downstream-side optical fiber core. Third-order or fourth-order lights strengthening each other in lights leaked into the downstream-side optical fiber cladding layer from the upstream-side optical fiber core end surface are reflected by the reflection surface provided in the cladding layer and detected with the photo-diode.

2 Claims, 10 Drawing Sheets

OPTICAL POWER MONITOR

BACKGROUND OF THE INVENTION

1. Field of the Invention

The present invention relates to an optical power monitor used mainly in the field of optical communication.

2. Description of the Related Art

In recent years, remarkable technological innovation on information communication has been brought about, and a transition from communication by an electrical signal to communication by an optical signal is being made to meet the demand for increasing the communication speed and to cope with the increase in the amount of information with the proliferation of the internet. On many of trunk cables, information from a multiplicity of relay points concentrates. Therefore, the conventional trunk cables are being replaced with optical cables advantageous in terms of processing capacity and rate. Restudy of communication between optical cables and user terminals has been started and there is an increasing demand for implementing a more comfortable information environment at a reduced cost.

With the implementation of optical networks, high-speed information exchange has been enabled and new uses of optical networks have been expanded. Correspondingly, the amount of information transmitted through optical networks is being increased. To increase the amount of information processible with an optical fiber, a technique using a high-frequency signal for increasing the amount of signal per unit time or a technique called a wavelength multiplex system, i.e., a technique for simultaneously transmitting signals with a multiplicity of wavelengths for different information items through one optical fiber, is being used. Forming a dense and highly reliable communication network requires ensuring connections in many directions to a multiplicity of paths and using a plurality of optical fibers. Use of a plurality of optical fibers is indispensable from the viewpoint of maintenance.

For the formation of an optical communication circuit for transmitting a multiplicity of signals through an optical fiber, a wavelength division multiplex (hereinafter abbreviated as WDM) system is required in which a wavelength multiplexed optical signal is divided into signals of different wavelengths; optical signals of different wavelengths are multiplexed; and tapping and insertion of optical signals are performed. With the increase in amount of information, the importance of handled information is increased. With respect to a dropout in an optical signal, it is necessary to immediately identify the optical signal and the place where the dropout has occurred. It is also necessary to check the signal intensity as well as the existence/nonexistence of the connection for the optical signal. If the transmission distance is increased, the optical signal intensity decreases during transmission through optical fibers only. Therefore there is a need for an erbium doped fiber amplifier (hereinafter abbreviated as EDFA) for amplifying optical signals. The intensity of an optical signal externally supplied and the intensity of the optical signal issued to the outside after being amplified are measured with the EDFA to determine the amplification ratio. The provision of a monitoring function in each of light transmission circuit portions has become indispensable for the construction of a highly reliable optical communication system.

For monitoring of an optical signal, a method is used in which a portion of the optical signal is tapped by an optical coupler and the optical signal taken out by being tapped is detected by a photo-diode connected to the optical fiber. This method requires fusion splicing connection of each component, which is a hindrance to the reduction in the number of mounting steps. The optical coupler has a structure in which cores which are optical signal transmission portions of optical fibers are placed close to each other to enable tapping of an optical signal The length of the core portions close to each other is an important parameter of the amount of tapping. It is, therefore, difficult to reduce the size of the product. In particular, in recent designs, the number of wavelengths to be multiplexed is increased to increase the amount of information transmittable at a time. Since signal detection is performed after demultiplexing into wavelengths, the number of optical power monitors necessary for one unit is increased. Since the housing space in a unit assignable to optical power monitors is limited, a reduction in size of each power monitor is necessarily required.

For example, U.S. Pat. No. 6,603,906 discloses an optical power monitor of a reduced size. FIG. 17B shows the structure of the disclosed optical power monitor. FIG. 17A shows an example of an optical power monitor assembly 71 having a plurality of optical power monitors 70 mounted in a case 69. With an upper lid of the case removed. FIG. 17B is a longitudinal sectional view of the optical power monitor 70. Referring to FIGS. 17A and 17B, a multi-capillary glass ferrule 53 having two optical fibers 51 and 52 and a gradient index (GRIN) lens 54 are opposed to each other with a predetermined gap 55 formed therebetween. A filter 56 is formed on an end surface of the GRIN lens 54. The filter 56 reflects or transmits light passing through the GRIN lens 54. Light transmitted through the GRIN lens 54 passes through a gap 57 and is converted into an electrical signal by a photon detector or a photo-diode 58 to be taken out through terminals 59. Through an electrical output from the photon detector 58, the intensity of light in the optical path can be obtained. The multi-capillary glass ferrule 53 and the GRIN lens 54 are positioned by means of glass tubes 60 and 60'. The GRIN lens is a glass cylinder having its refractive index continuously and radially outwardly from its center axis. If light expands outwardly, the direction in which the light travels is bent toward the center axis.

The flow of light will be described with reference to FIG. 17B. Light entering the gap 55 from the optical fiber 51 (input light) passes through the GRIN lens 54 to reach the filter 56 on the GRIN lens end surface. Most of the light reaching the filter 56 is reflected, passes through the GRIN lens 54 and the gap 55 and enters the optical fiber 52 to become output light. The light transmitted through the filter 56 passes through the gap 57, enters the photon detector 58 and is converted into an electrical signal to be output through the terminals 59. This light path is indicated by the solid line arrow. Conversely, when light is input through the optical fiber 52, the light travels through a path similar to the above-described optical path and light (output light) is taken out from the optical fiber 51. This light path is indicated by the broken line arrow. The names referred to in the specification of the U.S. patent document have been used in this description. In the specification of the present invention, the photon detector is referred to as a photo-diode.

In the optical power monitor 70 shown in FIG. 17B, light is emitted (radiated) into the air at least once. Since the air has a refractive index different from that of the optical fibers, light radiated into the air is diffused. A lens typified by the GRIN lens is indispensable for collecting diffused light. Consequently, the product size of the optical power monitor depends on the sizes of the GRIN lens and the glass tubes. It is, therefore, difficult to reduce the overall size of the optical power monitor assembly 71 shown in FIG. 17A.

Japanese Patent Laid-Open No. 2003-329862 discloses an optical power monitor using a waveguide. FIG. 18A is a plan view of an optical waveguide module formed of the optical power monitors. FIG. 18B is a sectional view for explaining the principle of measurement of the energy of light with the optical power monitor. A plurality of waveguides 90 are formed in a substrate 81 generally parallel to each other. A channel 83 extending perpendicularly to the waveguides 90 is provided to divides the waveguides 90 into portion on the input side 86 and portions on the output side 87. A reflecting filter 84 is inserted in the channel 83 and a photo-detector 85 is disposed above the reflecting filter 84 on the input section 86. A planer waveguide type of optical circuit 80 is thus formed. Description will be made of measurement of the energy of light by using the flow of light with reference to the sectional view of FIG. 18B. The waveguide 90 has an upper cladding layer 91 and a lower cladding layer 93, with a core 92 interposed therebetween. Light traveling through the core 92 is emitted into the air in the channel 83. Most of light passes through the reflecting filter 84 to enter the core 92 on the output side 87. Part (indicated by the broken line) of the light is reflected by the reflecting filter 84 to enter the photo-detector 85. This light is converted into an electrical signal. The intensity of light in the optical path can be measured in this way.

It can be easily understood that in the planer waveguide type of optical circuit 80 disclosed in the above-mentioned Japanese patent document the thickness of the substrate holding the waveguides, the mechanism for holding the photo-detectors and so on is a hindrance to the reduction in size. It is also well known that the light loss in the portions connecting the waveguides and the optical fibers is large. It is difficult to reduce the loss. As a means for reducing the loss, replacement of the optical waveguides in the art disclosed in the Japanese patent document with optical fibers is easily conceivable. Even in a case where the optical waveguides are replaced with optical fibers, light entering from the input side is emitted into the air once, as in the planer waveguide type of optical circuit 80 disclosed in the Japanese patent document. Since the light emitted into the air is separated by the reflecting filter into light traveling to the output side and light entering the photo-detector, it is difficult to reduce the light loss.

Even with respect to the optical power monitor 70 disclosed in the above-mentioned U.S. patent document, which is considered to be a low-loss monitor, it is thought that the limit to the reduction in size of the single-channel optical power monitor 70 is 3.0 mm in diameter×20 mm as long as the assembly uses individual pigtail fibers, GRIN lens and photon detectors. As shown in FIG. 17A, the components are housed in the case 69 for multi-channel arrangement. The product size is further increased thereby and it is difficult to reduce the overall size.

SUMMARY OF THE INVENTION

An object of the present invention is to provide an optical power monitor capable of being reduced in size and having a reduced light transmission loss even in a multi-channel arrangement.

An optical power monitor in accordance with the present invention has two optical fibers, each having a core in its center and a cladding layer around the core, which are disposed on an upstream side and on a downstream side of light transmissions, respectively, and which end surfaces face and are fusion-spliced to each other at a fusion splicing portion with their core optical axes offset from each other, a light reflection surface disposed in the cladding layer of the downstream-side optical fiber, facing part of the end surface of the upstream-side optical fiber core, which is offset and protrudes from the end surface of the downstream-side optical fiber core at the fusion splicing portion, and being at a certain angle with the core optical axis of the downstream-side optical fiber, and a photo-diode disposed opposite to the light reflection surface with respect to the downstream-side optical fiber core. The photo-diode detects lights that are transmitted through the upstream-side optical fiber core, leaked into the cladding layer of the downstream-side optical fiber from the part of the end surface of the upstream-side optical fiber core offset and protruding from the end surface of the downstream-side optical fiber core, and reflected by the light reflection surface. The light reflection surface is located at a position that the lights leaked into the cladding layer of the downstream-side optical fiber from the part of the end surface of the upstream-side optical fiber core interfere and strengthen each other.

Preferably, the light reflection surface is located at a third or forth position that the lights leaked into the cladding layer of the downstream-side optical fiber from the part of the end surface of the upstream-side optical fiber core interfere and strengthen each other.

Each optical fiber is formed of a cure positioned at a center of the optical fiber and a cladding layer covering the periphery of the core. Total reflection of light transmitted through the optical fiber core is caused by the core peripheral surface corresponding to the boundary between the core having a larger refractive index and the cladding layer having a smaller refractive index to ensure that the light is transmitted only in the core. If the end surfaces of the two optical fibers are fusion-spliced to each other while setting an offset of several microns between the optical axes of the cores of the optical cables, the connection between the core end surfaces and the connection between the cladding end surfaces occupy a great part of the fusion splicing portion. Through the connection between the core end surfaces, light is transmitted from the upstream-side fiber core to the downstream-side fiber core. On the other hand, through the fusion splicing connection between a portion of the core end surface of the upstream-side optical fiber and the cladding layer end surface of the downstream-side optical fiber, light reaching the fusion-spliced surface after being transmitted through the upstream-side optical fiber core is leaked into the downstream-side optical fiber cladding layer opposed to the upstream-side optical fiber core. The leaked light travels forward without being impeded. However, the light leaked into the cladding layer end surface through the portion of the core end surface fusion-spliced expands radially in the cladding layer because there is a difference in refractive index between the core and the cladding layer, and because the core end surface portion fusion-spliced to the cladding layer end surface has a crescent shape. The light expanding radially in the cladding layer is transmitted in the cladding layer while being repeatedly reflected by the peripheral surface of the cladding layer. Lights thus transmitted and reflected travel while interfering with each other to strengthen or weaken each other during transmission in the cladding layer. The lights transmitted in the cladding layer while being repeatedly reflected are reflected by the light reflection surface provided in the cladding layer and facing the core end surface portion. The direction in which the lights travel is thereby changed so that the lights are radiated out of the optical fiber. If the photo-diode is disposed on the light travel direction extension line along which the lights reflected by the light reflection surface travel, the energy of light is converted into a current by the photo-diode, thereby obtaining an electrical signal proportional to the energy of light.

The light transmission upstream-side optical fiber core end surface and the light transmission downstream-side optical fiber core end surface are joined to each other while being offset by several microns from each other. Therefore the portion of the upstream-side core section protruding from the downstream-side core in the optical fiber core joint portion seen from the light transmission downstream side is seen in a crescent shape. The maximum width of the crescent shape corresponds to the amount of offset. The shape of the fusion splicing portion in a longitudinal section in the state of being joined before fusion splicing is such that the core end surfaces are generally perpendicular to the center axis of the optical fibers, and the generally perpendicular end surfaces are offset by several microns from each other. When the optical fiber end surfaces are heated to be fusion-spliced to each other, the core end surfaces are fusion-spliced to each other, with the corners of the core end surfaces having certain curvatures due to surface tension. The corners of the cladding layer end surfaces also have certain curvatures.

The fusion-spliced surfaces of the cores have the crescent shape with the curvature in the optical fiber longitudinal section. Lights going out of the core end surface into the downstream-side cladding layer parallel to the plane having the curvature, i.e., the offset plane (the plane containing the upstream-side core optical axis and the downstream-side core optical axis), have different angles to the core optical axis due to the curvature of the core end surface produced by fusion splicing, such that the lights reflected in the cladding layer interfere with each other to strengthen or weaken each other. Preferably, third-order or fourth-order lights strengthening each other are reflected by the light reflection surface and the reflected lights are detected with the photo-diode. It is, therefore, important that the above-described portion of the upstream-side optical fiber core should be opposed at a predetermined angle to the light reflection surface. In other words, in the longitudinal section perpendicular to the offset plane, the fusion splicing portion is perpendicular to the optical axes of the optical fiber cores, and the light reflection surface is also perpendicular to the optical axes. Therefore the above-described portion of the upstream-side core end surface and the light reflection surface are parallel to each other. In the offset plane, the fusion-spliced core end surface and the light reflection surface respectively have certain angles to an optical fiber transverse section. Therefore the above-described portion of the core end surface in the fusion splicing portion and the light reflection surface are opposed to each other at a predetermined angle. On the other hand, in the plane perpendicular to the offset plane, lights going out of the above-described portion of the upstream-side core end surface travel symmetrically about the optical fiber offset plane to be reflected by the cladding layer peripheral surface. Therefore these lights do not interfere with each other.

It has been experimentally found that, in the offset plane, the fusion splicing portion curvature is minimized on the periphery of the upstream-side core end surface, that is, the curvature radius is maximized, and that, conversely, the fusion splicing portion curvature in the offset plane is maximized at a position at which the periphery of the downstream-side core end surface is adjacent to the upstream-side core end surface, that is, the curvature radius is minimized. The relationship between the fusion splicing portion curvature and the light emergence angle has also been experimentally made clear. At a peripheral portion of the upstream-side core end surface, the angle θu of emergence of light with respect to the core optical axis is 5° to 15°. At a portion of the upstream-side core end surface adjacent to the downstream-side core end surface periphery, the angle θd of emergence of light is 2° to 12°. At the optical fiber core end surfaces fusion-spliced to each other while being offset, θu is larger than θd and the difference between θu and θd is about 3° to about 6°. The light emergence angle varies depending on the location in the fusion splicing portion. There is, therefore, a difference between the period with which light radiated into the cladding layer from a position close to the periphery of the upstream-side core end surface is repeatedly reflected in the cladding layer and the period with which light radiated from a portion of the upstream-side core end surface close to the downstream-side core end periphery is repeatedly reflected in the cladding layer. These lights therefore interfere with each other and periodically strengthen and weaken each other at certain positions. If the position at which the lights strengthen each other first time is the first-order position, lights leaked into the downstream-side fiber cladding layer from the upstream-side core end surface in the fusion splicing portion can be collected on the light reflection surface with maximized efficiency by providing the light reflection surface at the third-order or fourth-order strengthening position.

The optical power monitor of the present invention can be provided as a single-channel optical power monitor having an optical fiber with a light reflection surface and a photo-diode housed in a case. A multi-channel optical power monitor assembly can also be provided by arranging a plurality of the optical power monitors in parallel with each other. The size of the assembly can be reducing by using one multi-channel photo-diode in place of the row of a plurality of photo-diodes. In the optical power monitor of the present invention, part of light transmitted through the optical fiber is leaked from the upstream-side core end surface into the downstream-side cladding layer at the fusion splicing portion; the direction in which the leaked light travels is changed through about 90° by the light reflection surface provided in the cladding layer of the downstream-side optical fiber to emit the leaked light into the air through the cladding layer opposite from the light reflection surface; and the emitted air is converted into an electrical signal by the photo-diode. Since the light going out of the cladding layer into the air is detected, light coming from the adjacent fibers and light entering from the outside of the case act as noise. Therefore, light shielding between each adjacent pair of optical fibers and case shielding are indispensable.

Preferably, in the optical power monitor of the present invention, the light reflection surface provided in the downstream-side optical fiber cladding layer is located at a distance of 4.5 to 7.5 mm downstream from the fusion splicing portion.

The angle of emergence of light leaked into the downstream-side optical fiber cladding layer from the core end surface in the fusion splicing portion cannot be easily calculated, because it depends on the curvatures of core end surface portions. From the results of a number of experiments, it has been found that the responsivity is increased if the light reflection surface is provided at the third-order or fourth-order strengthening position. The position of the light reflection surface depends on the wavelength of light used. However, it is at a distance equal to or larger than 4.5 mm and equal to or smaller than 7.5 mm. The wavelength range of light mainly used for communication is 1520 nm to 1620 nm. The third-order or fourth-order strengthening position varies depending on the wavelength. However, the length of the light reflection surface is sufficiently large in Comparison with the wavelength. Therefore the wavelength difference of 100 nm can be ignored.

Preferably, in the optical power monitor of the present invention, the light reflection surface is at an angle of 38° to 45° with respect to the core optical axis of the downstream-side optical fiber.

Since the light reflection surface provided in the downstream-side optical fiber cladding layer functions to change the direction of travel of the light transmitted through the cladding layer through about 90°, it is preferable that the angle at which the light reflection surface faces the optical axis of the downstream-side optical fiber is 38° to 45°. If the angle is smaller than 38°, the light is reflected by the light reflection surface but most of the reflected light is radiated to the cladding layer periphery at a such a large angle that the energy of light returned by being reflected by the cladding layer periphery is increased. Conversely, if the angle is larger than 45°, the proportion of light transmitted through the light reflection surface is increased and the responsivity is reduced. A good characteristic can be obtained by setting the light reflection surface at an angle of 38° to 45°.

Preferably, the light reflection surface is a side surface of a notch on the fusion splicing portion side cut perpendicularly to the core optical axis of the downstream-side optical fiber in the cladding layer of the downstream-side optical fiber. The notch side surface opposite from the notch side surface on the fusion splicing portion side has no influence on the reflection of the leaked light and may, therefore, have any shape. Also, it is not necessary to particularly specify the shape of the bottom of the notch. The notch can be easily formed by machining. It is preferable to make symmetric the sectional shape of the notch formed of the side surface on the fusion splicing portion side and the opposite side surface for the purpose of avoiding leaving working stress in the optical fiber. Forming the notch in V shape in particular is preferred. Any working technique other than machining may be can be used if the angle of the side surface on the fusion splicing portion side with respect to the optical fiber core optical axis can be set with accuracy. For example, a dry etching technique such as ion milling may be used to form the notch.

In the optical power monitor of the present invention, it is preferable that the distance between the bottom of the notch and the periphery of the downstream-side optical fiber core is 0.5 to 8 μm.

Part of the light transmitted through the upstream-side core is leaked into the downstream-side optical fiber cladding layer from a portion of the upstream-side core end surface and is reflected by the side surface of the notch on the fusion splicing portion side to be detected by the photo-diode. It is, therefore, important to radiate the light to the notch side surface with reliability. If the notch is shallow, that is, the area of the notch side surface on the fusion splicing portion side, then some portion of the light does not strike the notch side surface, such that the proportion of light transmitted through a portion of the cladding layer in the vicinity of the core is increased. It is, therefore, necessary to limit the distance between the periphery of the downstream-side optical core and the bottom of the notch to 8 μm or less. On the other hand, a definite boundary exists between the core and the cladding layer, although the optical fiber is constructed so that light is transmitted through a core. Therefore, some light is leaked from the core into a portion of the cladding layer in the vicinity of the core. If the notch is deeper and if the distance between the core periphery and the notch bottom is smaller than 0.5 μm, light transmitted in a portion of the cladding layer in the vicinity of the core and light transmitted through the core are leaked into the space in the notch so that the transmission loss is large. It is, therefore, preferred that the distance between the notch bottom and the core periphery be 0.5 to 8 μm.

The direction of travel of lights leaked into the downstream-side optical fiber cladding layer from a portion of the upstream-side optical fiber core end surface at the fusion splicing portion and interfering with and strengthening each other while being reflected in the cladding layer is changed through about 90° at the light reflection surface in the downstream-side optical fiber cladding layer. The reflected lights pass through the cladding layer on the light reflection surface side, the core and the cladding layer opposite from the light reflection surface, exit from the downstream-side optical fiber and enters the photo-diode.

Preferably, in the optical power monitor of the present invention, the offset between the core optical axes of the two optical fibers is 0.05 times to 0.32 times the core diameter of the optical fibers.

The energy of light leaked into the cladding layer can be changed by changing the offset. The distribution of the intensity of light in the core conforms to a Gaussian distribution. Therefore the change in energy of light becomes larger as the offset is increased. Single-mode optical fibers generally used have a core diameter of 9.2 μm (wavelength: 1310 nm). When the core ends are fusion-spliced to each other with an offset of 2.5 μm, the responsivity is about 100 mA/W. The responsivity is represented by the output current (mA/W) from the photo-diode with respect to the intensity (W) of light entering the photo-diode.

Preferably, in the optical power monitor of the present invention, the surface roughness Ra of the light reflection surface is less than 2 nm.

Light transmitted in the downstream-side optical fiber cladding layer is reflected by the light reflection surface provided in the cladding layer, and the energy of light entering the photo-diode changes according to the surface roughness of the light reflection surface, that is, the responsivity is changed. If the surface roughness is increased, the reflected light diverges due to light diffusion so that the light entering the photo-diode weakens. If the surface roughness Ra is 2 nm or less, high responsivity can be obtained. The surface roughness Ra is a value measured in accordance with JIS B0601. Since the wavelength of light used is a long wavelength in the vicinity of 1550 nm, specifying undulation of the surface is effective in increasing the responsivity as well as specifying the surface roughness Ra. The roughness motif average length AR is obtained from an envelop undulation curve in accordance with JIS B0631. The effect of reflecting light can be increased by reducing AR relative to the wavelength to be used. Preferably, AR is ½ or less of the wavelength to be used.

Preferably, in the optical power monitor of the present invention, a metal film formed on the side surface of the notch on the fusion splicing portion side and having a high reflectance is used as the light reflection surface.

The provision of a metal film having a high reflectance on the side surface of the notch on the fusion splicing portion side is effective in increasing responsivity. The right reflection efficiency of the high-reflectance light reflection film can be increased by the effect of limiting light diffusion when light is reflected and the effect of limiting transmission through the light reflection surface. As the metal film, gold (Au), silver (Ag), aluminum (Al) or copper (Cu) having high reflectance is desirable. From the viewpoint of stability with time, it is preferable to use Au not easily oxidizable rather than Ag, Al and Cu easily oxidizable. Film forming of the metal film can be performed by vapor deposition or sputtering. The metal film may be provided on the entire optical fiber peripheral surface and the notch surface other than an optical fiber surface portion facing the photo-diode as well as on the side surface on the fusion splicing portion side. Covering the entire optical fiber peripheral surface other than the optical fiber surface portion facing the photo-diode is effective in limiting the influence of external light.

It is known that the light-current conversion characteristics of the photo-diode change with time due to humidity. It is, therefore, preferable to fill the inside of the hermetic case for the optical fiber monitor of the present invention with dry nitrogen or dry argon gas.

Preferably, the optical power monitor of the present invention further has a first support block holding the upstream-side optical fiber on the upstream side of the fusion splicing portion, and a second support block holding the downstream-side optical fiber on the downstream side of the light reflection surface. Part of the two optical fibers between the first and the second support blocks is curved in an arc-like shape to rise in a direction opposite to the direction toward the photo-diode.

The optical power module in which the part of two optical fibers between the two support blocks (first and second support blocks) is straight has an average responsivity of 65.2 mA/W improved by about 10 mA/W from that of the conventional optical waveguide module shown in FIG. 18, but has a responsivity variation range of 33 mA/W. This value is two times or more the value ordinarily required of the responsivity variation range. In the optical power monitor in which the two optical fibers have a part curved in an arc-like shape between the two blocks in a direction opposite to the direction toward the photo-diode, the average responsivity can be further increased and the responsivity variation range can be reduced to half If the part of the two optical fibers of the optical power monitor between the two support blocks is flat, in other words, the curvature radius of the curve is infinite, or if the part is curved in an arc-like shape in the direction toward the photo-diode (hereinafter referred to as "downward arc"), a reduction in responsivity results. Therefore forming the part of the two optical fibers in such a shape is undesirable. The part of the two optical fibers between the two support blocks is curved in an arc-like shape in the direction opposite to the direction toward the photo-diode (hereinafter referred to as "upward arc"). As the curvature radius of the curve is reduced, a maximum value and a minimum value of the responsivity appear alternately. It is preferable to curve the two optical fibers between the two support blocks so as to have such a curvature radius that the responsivity of the optical power monitor is close to a maximum value.

If a stress is applied to the optical fiber, the speed of light transmitted through the optical fiber changes. When the optical fiber is curved in an arc-like shape, it is stressed in different ways on the outer and inner sides of the optical axis of the core in the radial direction of the arc; compressive stress is applied on the inner side in the radial direction, while tensile stress is applied on the outer side in the radial direction. Since the optical power monitor of the present invention has the downstream-side optical fiber curved in an arc-like shape, the transmission speed at which light leaked into the downstream-side optical fiber cladding layer from a portion of the upstream-side core end surface travels in the cladding layer on the inner side in the radial direction of the arc and the transmission speed at which leaked light travels in the cladding layer on the outer side in the radial direction of the are differ from each other. The lights having the different transmission speeds interfere with each other. Therefore, if the light reflection surface is provided at a position at which the lights strengthen each other by interfering with each other, the responsivity is increased. The speed of transmission of light in the cladding layer is changed by stress applied to the optical fiber. It is, therefore, possible to adjust the light strengthening position by changing the curvature radius of the optical fiber. In the present invention, the curvature radius of the part of the two optical fibers between the two support blocks is defined to set the curvature radius of the part of the downstream-side optical fiber between the fusion splicing portion and the light reflection surface to a preferable value.

Preferably, in the optical power monitor of the present invention, the part of the two optical fibers between the first and second support blocks has a peak of the arc-like shape substantially at a mid-point between the first and second support blocks.

Preferably, in the present invention, the distance between the first support block and the fusion splicing portion is equal to the distance between the light reflection surface and the second support block. These distances are equalized to enable the peak of the arc-like shape to be positioned substantially at the mid-point of the part of the two optical fibers between the first and second support blocks. Also, the peak can be positioned substantially at the mid-point between the fusion splicing portion and the light reflection surface, and the light reflection surface can be provided at a position at which lights leaked into the downstream-side optical fiber cladding layer from the upstream-side core end surface in the fusion splicing portion strengthen each other, thus increasing the responsivity of the optical power monitor and reducing variation in responsivity.

Preferably, a third support block is provided substantially at the mid-point between the first and second support blocks to support the part of the two optical fibers between the first and second support blocks, thereby forming the peak of the arc-like shape in the part of the optical fibers. The part of the two optical fibers between the first and second support blocks is supported at the mid-point by the third support block so that the position of the mid point is higher than about 100 µm or less than a straight line connecting the upper surfaces of the first and second support blocks. Preferably, the extreme end of the third block to be brought into contact with the part of the two optical fibers between the first and second support blocks is a curved surface having a radius of about 1 mm rather than an edge having an acute angle.

Preferably, in the optical power monitor of the present invention, the part of the two optical fibers curved in the arc-like shape has a curvature radius of 0.086 m to 0.111 m or 0.347 m to 2.667 m.

The curvature radius of the optical fibers is determined by the distance between the support blocks and the distance between the peak and the chord of the arc-like shape. In the optical power monitor of the present invention, however, the curved part of the two optical fibers has the fusion splicing portion and the light reflection surface, i.e., the notch. For this reason, the shape of the curved part cannot be a circular arc in a strict sense. In the description of the present invention, therefore, the shape of the curved part is referred to as "arc-like shape". The curvature radius r can be obtained by $r = h/2 + L^2/8h$ from the distance L between the two support blocks and the distance h between the peak and the chord of the are. Since h is extremely small in comparison with L, the curvature radius is obtained as $r = L^2/8h$.

The responsivity of the optical power monitor of the present invention in which the part of the two optical fibers between the two support blocks has the shape of an upward arc is generally increased as the curvature radius of the part is reduced. As the curvature radius is reduced from infinity, a maximum value and a minimum value of the responsivity appear alternately. The first maximum value appears at a curvature radius of about 0.6 m, and the second maximum value appears at a curvature radius of about 0.1 m. A responsivity exceeding 70 mA/W is obtained when the curvature radius is in the range from 0.347 m to 2.667 m or in the range from 0.086 m to 0.11 m. Between these ranges, a range from 0.111 m to 0.347 m in which curvature radii at which minimum values of the responsivity appear exists. The responsivity at the curvature radius in this range has a considerably low value of 50 mA/W.

Since the responsivity at the second maximum point is higher than that at the first maximum point, use of the third maximum point is naturally conceivable. However, the curvature radius at which the third maximum value is exhibited is considered to have an extremely small value of about 0.01 m. It is impossible to bend the optical fiber made of quartz with a curvature radius of about 0.01 m. It is, therefore, preferable to use a value in the vicinity of the first or second maximum point. To ensure a responsivity of 70 mA/W or higher while avoiding breakage of the optical fiber in a heat cycle test, a minimum curvature radius of 0.086 m is selected.

Preferably, in the optical power monitor of the present invention, the distance between the first and the second support blocks is 4.8 mm to 14.0 mm, and each of the distance between the first support block and the fusion splicing portion and the distance between the light reflection surface and the second support block is 0.2 mm to 2.0 mm. By selecting this size, an optical power monitor small in size and having a high responsivity and a reduced responsivity variation range can be obtained.

The optical power monitor of the present invention has two optical fibers provided on the light transmission upstream and downstream sides and having cores, the end surfaces which are opposed to each other with the core optical axes offset from each other, and which are fusion-spliced to each other in a fusion splicing portion, a light reflection surface which faces a portion of the upstream-side optical fiber core end surface offset to protrude from the downstream-side optical fiber core end surface in the fusion splicing portion, and which is provided in the downstream-side optical fiber cladding layer, and a photo-diode positioned opposite from the light reflection surface with respect to the downstream-side optical fiber core. Third-order or fourth-order lights strengthening each other in lights leaked into the downstream-side optical fiber cladding layer from the upstream-side optical fiber core end surface are reflected by the reflection surface provided in the cladding layer and detected with the photo-diode. Thus, the present invention has made it possible to provide an optical power monitor capable of being reduced in size even when designed as a multi-channel monitor, and having a reduced light transmission loss.

The optical power monitor of the present invention may further have a first support block holding the upstream-side optical fiber on the upstream side of the fusion splicing portion and a second support block holding the downstream-side optical fiber on the downstream side of the light reflection surface. The part of the two optical fibers between the first and second support blocks is curved in an arc-like shape to rise in a direction opposite to the direction toward the photo-diode. In this case, the responsivity can be further improved and the responsivity variation range can be reduced.

BRIEF DESCRIPTION OF THE DRAWINGS

FIG. 17A is a perspective view, and FIG. 17B is a longitudinal sectional view of one optical power monitor in the assembly; FIG. 18A is a plan view and FIG. 18B is a longitudinal sectional view.

DETAILED DESCRIPTION OF THE PREFERRED EMBODIMENTS

Figure 1:
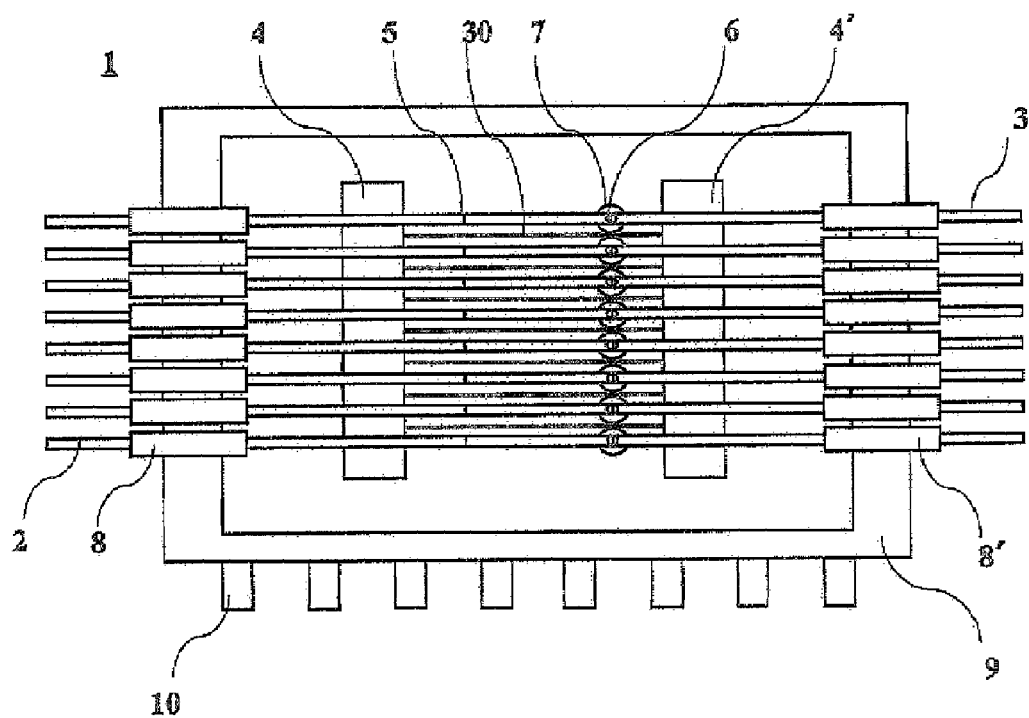
FIG. 1 is a plan view of an optical power monitor of the present invention in a state where an upper lid is removed.

The present invention will be described in detail with respect to examples thereof with reference to the accompanying drawings. For ease of description, the same components or portions are indicated by the same reference numerals.

EXAMPLE 1

Figure 2:
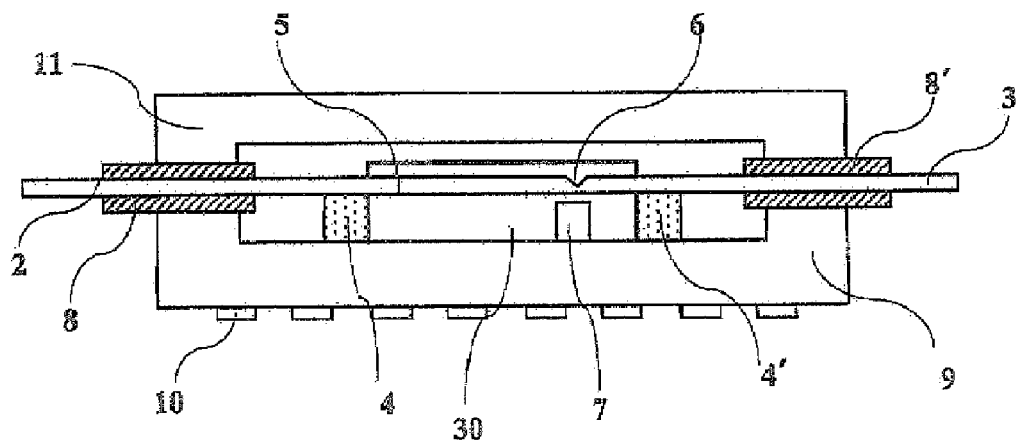
FIG. 2 is a longitudinal sectional view of the optical power monitor of the present invention.
Figure 3A:
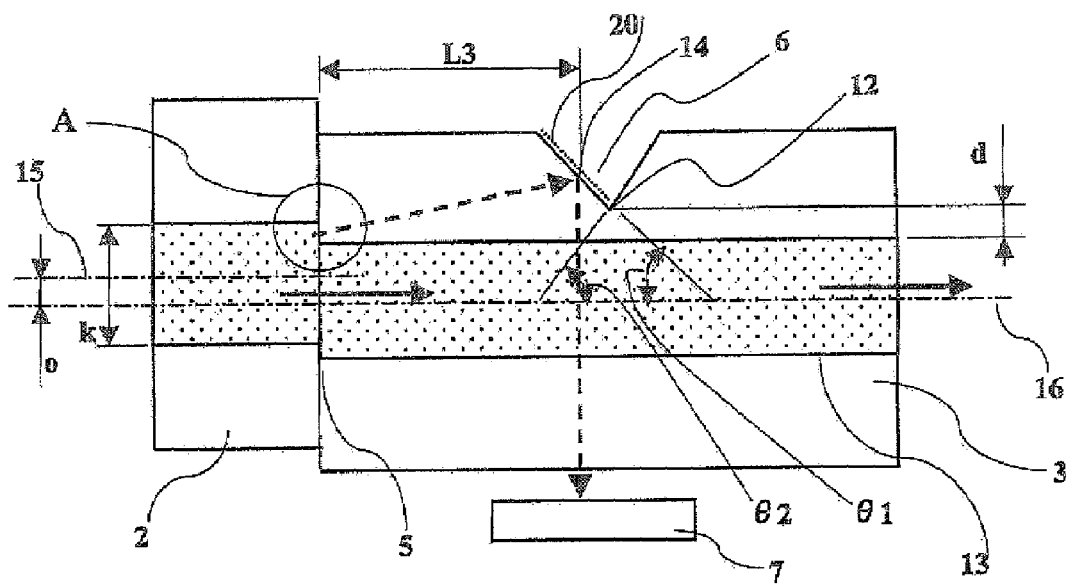
FIG. 3A is an enlarged longitudinal sectional view for explaining a fusion splicing portion between two optical fibers and a notch in the downstream-side optical fiber, FIG. 3B a longitudinal sectional view along an offset plane for explaining the fusion splicing portion between the two optical fibers, and FIG. 3C a transverse sectional view for explaining the fusion splicing portion.
Figure 3B:
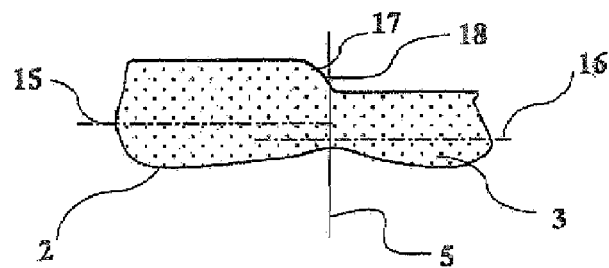
Figure 3C:
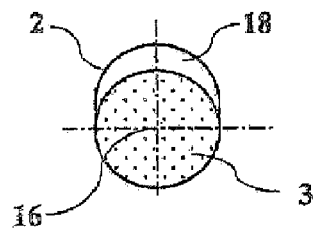
Figure 4A:
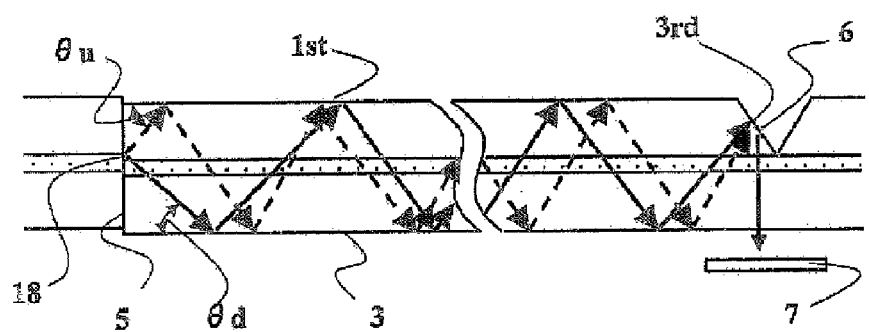
FIGS. 4A and 4B are schematic diagrams for explaining travel of light leaked into a cladding layer from the core of the fusion splicing portion.
Figure 4B:
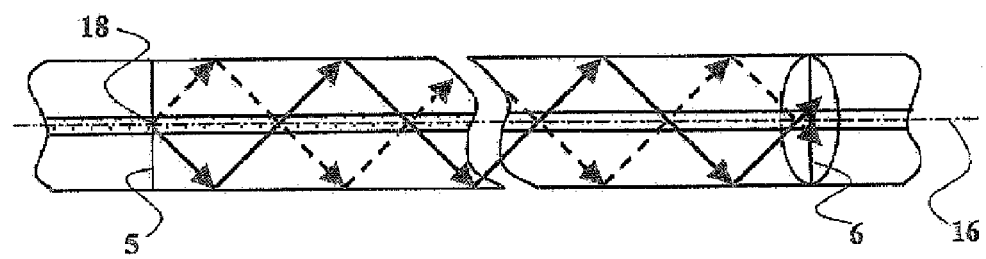

FIG. 1 is a plan view of an optical power monitor of the present invention in a state where an upper lid is removed. FIG. 2 is a longitudinal sectional view of the optical power monitor. FIG. 3A is an enlarged longitudinal sectional view for explaining a fusion splicing portion between two optical fibers and a notch in the downstream-side optical fiber. FIG. 3B is an enlarged longitudinal sectional view along an offset plane for explaining the fusion splicing portion between the two optical fibers. FIG. 3C is a transverse sectional view for explaining the fusion splicing portion. FIGS. 4A and 4B are schematic diagrams for explaining travel of light leaked into a cladding layer from a core of the fusion splicing portion.

The structure of an optical power monitor assembly 1 of the present invention will be described in detail with reference to FIGS. 1 and 2. FIG. 1 shows an 8-channel optical power monitor assembly 1 having eight optical power monitors housed in a case 9. Light transmission upstream-side optical fibers 2 and light transmission downstream-side optical fibers 3 are led out from the case 9 through protective tubes 8 and 8'. An upper lid 11 is bonded on the case 9 with adhesive (not shown). The case 9 is filled with dry nitrogen gas. Electrodes 10 of photo-diodes 7 are led out from a side wall of the case 9. Wiring laid in the case 9 between the photo-diodes 7 and the electrodes 10 is not shown. A first support block 4, a second support block 4' and the photo-diodes 7 are fixed on an inner bottom surface of the case 9 with adhesive. Each of the first support block 4 and the second support block 4' has eight V-grooves for maintaining the distance to the optical fibers with accuracy. The optical fibers are bonded in the V-grooves of the first and second support blocks 4 and 4' with adhesive. The photodiodes 7 are disposed on a portion of the case inner bottom surface corresponding to notches in the optical fibers. Each of the pairs of the light transmission upstream-side optical fibers 2 and the light transmission downstream-side optical fibers 3 spliced to each other will be referred to as "optical fiber" as occasion demands in the following description unless otherwise mentioned. A light shielding plate 30 is provided between each adjacent pair of the optical fibers to prevent interference of light.

The sizes of portions of the optical power monitor, the flow of light and so on will be described with reference to FIGS. 3A to 3C. As shown in FIG. 3A, the end surfaces of each light transmission upstream-side optical fiber 2 and the corresponding light transmission downstream-side optical fiber 3 were fusion-spliced to each other, with an offset o between a core optical axis 15 of the light transmission upstream-side optical fiber 2 and a core optical axis 16 of the light transmission downstream-side optical fiber 3 set to 2 µm. After offset fusion splicing, a V-notch 6 was formed in the optical fiber by grinding so that a center of a light reflection surface 14 is at a distance L3 of 6.80 mm from a fusion splicing portion 5 of the optical fiber. The depth of the notch 6 was 55.0 µm and the distance d between a notch bottom 12 and the core periphery was 2.9 µm. The side surface of the notch 6 on the fusion splicing portion side, i.e., the light reflection surface 14, had an angle θ1 of 40.5° to the core optical axis, a surface roughness Ra of 1.2 nm and a roughness motif average length AR of 580 nm obtained from an envelope undulation curve. For reference, the side surface of the notch 6 opposite from the fusion splicing portion side had an angle θ2 of 45.2° to the core optical axis. A gold light reflection film 20 having a thickness of 0.03 µm was formed on the surface of the notch on the fusion splicing portion side by vacuum deposition.

Light (solid line arrow) transmitted through the core of the light transmission upstream-side optical fiber 2 is divided into light (broken line arrow) leaked into a cladding layer of the downstream-side optical fiber 3 and light (solid line arrow) entering the core of the downstream-side optical fiber 3. The light entering the core of the downstream-side optical fiber 3 passes through the core without going gut of the core into the air even once. In the conventional optical power monitor, light in the measurement portion goes out into the air at least once and returns to the optical fiber or the optical waveguide. One of the features of the optical power monitor of the present invention is that the light other than the leaked light entering the photo-diode does not go out into the air even once. This is one of the reasons for the effect of obtaining a reduced transmission loss. In lights leaked into the clad layer at the fusion splicing portion 5, third-order or fourth-order lights interfere with and strengthen each other while being repeatedly reflected in the clad layer. The optical path for these lights is bent through an angle of about 90° by the light reflection surface 14 of the notch 6 to enable these lights to pass through the cladding layer, the core and the cladding layer of the downstream-side optical fiber 3, go out into the air and enter the photo-diode 7 to be converted into an electrical signal.

The offset fusion splicing portion 5 of the core existing in the region indicated by circle A in FIG. 3A will be described in detail with reference to FIGS. 3B and 3C. FIG. 3B is a longitudinal sectional view of the fusion splicing portion along the offset plane. The core of the light transmission upstream-side optical fiber 2 and the core of the light transmission downstream-side optical fiber 3 are integrally joined to each other by being molten so as to form a curved surface 17. Lights leaked into the downstream-side optical fiber cladding layer by being transmitted through the curved surface 17 enter the cladding layer at various angles and travel in the cladding layer while being repeatedly reflected. The lights repeatedly reflected interfere with each other to strengthen or weaken each other. The curved surface 17 has an important function to cause interference of light. FIG. 3C shows a core cross-section of the fusion splicing portion seen from the downstream-side optical fiber 3. The core of the upstream-side optical fiber 2 partially projects from the core of the downstream-side optical fiber 3 to form a crescent portion 18 in the core end surface.

FIGS. 4A and 4B are diagram schematically showing the flow of light leaked into the downstream-side optical fiber cladding layer from the crescent portion 18 in the upstream-side core end surface protruding from the downstream-side core. FIG. 4A shows the flow of light in the cladding layer of the downstream-side optical fiber 3 in the offset plane. The direction in which the leaked light goes out of the crescent portion 18 in the upstream-side core end surface diverges into different directions at the curved surface. Light going out at an angle θu as indicated by the broken line arrow and light going out at an angle θd as indicated by the solid line arrow travel in the cladding layer while being repeatedly reflected at the peripheral boundary of the cladding layer. Therefore these lights strengthen each other at positions at which the core ends of the broken line arrow and the solid line arrow are closer to each other. The first strengthening position is assumed to be a first-order position and the light reflection surface 14 of the notch 6 is provided at the third-time (third order) or the fourth-time (fourth order) strengthening position. The direction in which the light travels is changed through an angle of about 90° at the light reflection surface, and the light travels in the changed direction to enter the photo-diode 7. The weakening portion and the strengthening portion appear alternately. FIG. 4B shows the flow of light in a section perpendicular to the offset plane. The lights going out of the crescent portion 18 in the core end surface are symmetric about the core optical axis 16 (corresponding to the offset plane in FIG. 4B). Therefore the lights travel while being reflected at the cladding layer periphery without interfering with each other and reach the light reflection surface. In this example, the angle θu was 14.0° and the angle θd was 9.6°.

Figure 17A:
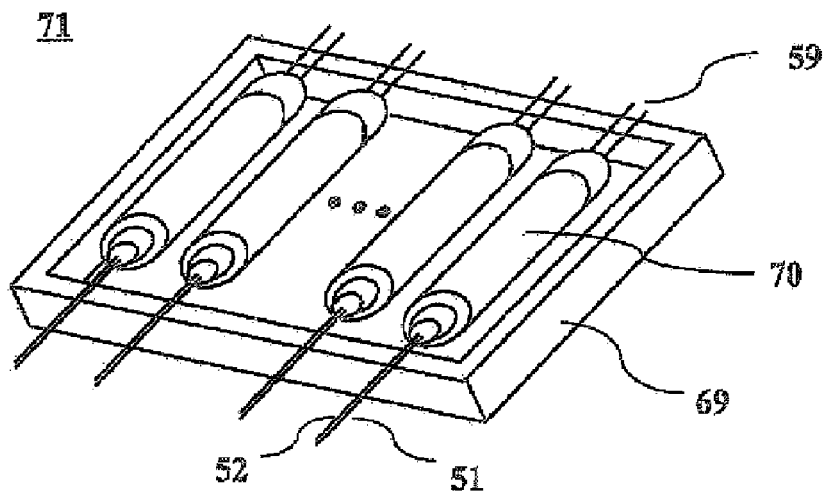
FIGS. 17A and 17B show a conventional optical power monitor assembly.
Figure 17B:
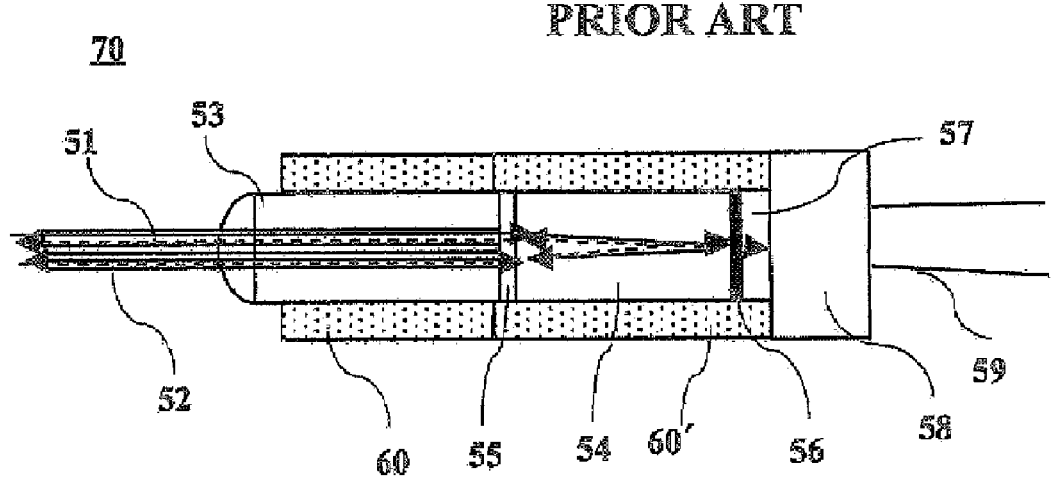
Figure 18A:
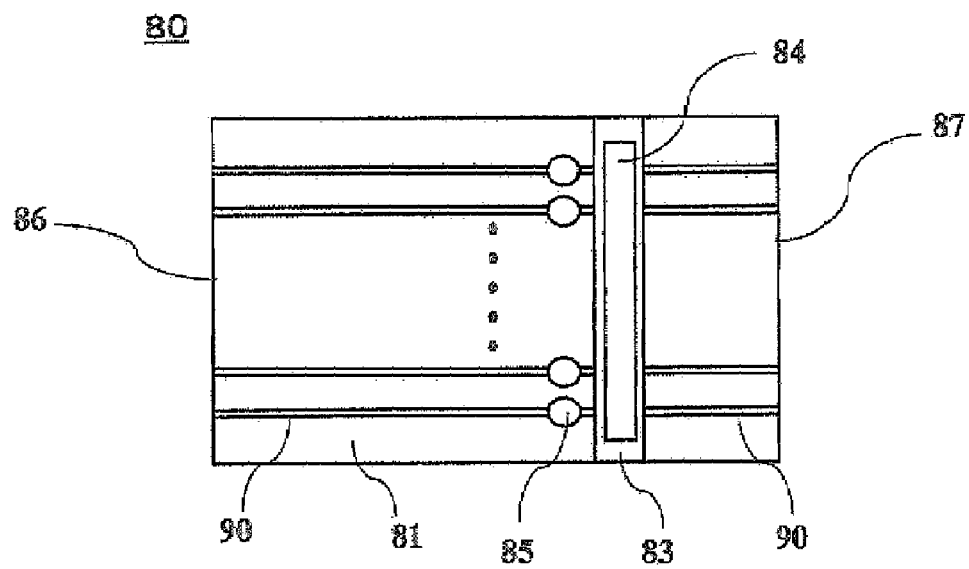
FIGS. 18A and 18B show a conventional planar waveguide type of optical power monitor.
Figure 18B:
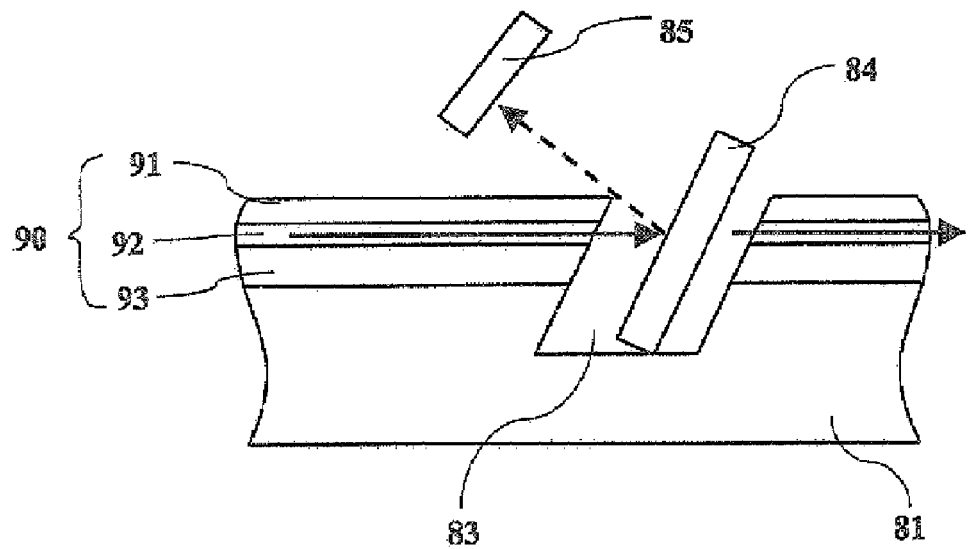

Light with a wavelength of 1550 nm and having an optical intensity of 1.2 mW was input to twenty completed optical power monitor assemblies to evaluate optical power monitor characteristics. Since twenty 8-channel assemblies were used, the characteristics of a total of 160 channels were measured and the average was calculated from the measurement. Good values were obtained: a transmission loss of −0.72 dB and a responsivity of 64.4 mA/W. The light shielding plates placed between the optical fibers results in reducing the crosstalk to −48.3 dB. The external size of the case 9 with the upper lid 11, exclusive of the protective tubes 8 and 8' and the electrodes 10, was 23 mm L×17 mm W×2.6 mm H. Thus, the optical power monitor assembly of the present invention was reduced to 1/5 in volume of the conventional optical power monitor assembly shown in FIG. 17A.

EXAMPLE 2

Figure 5:
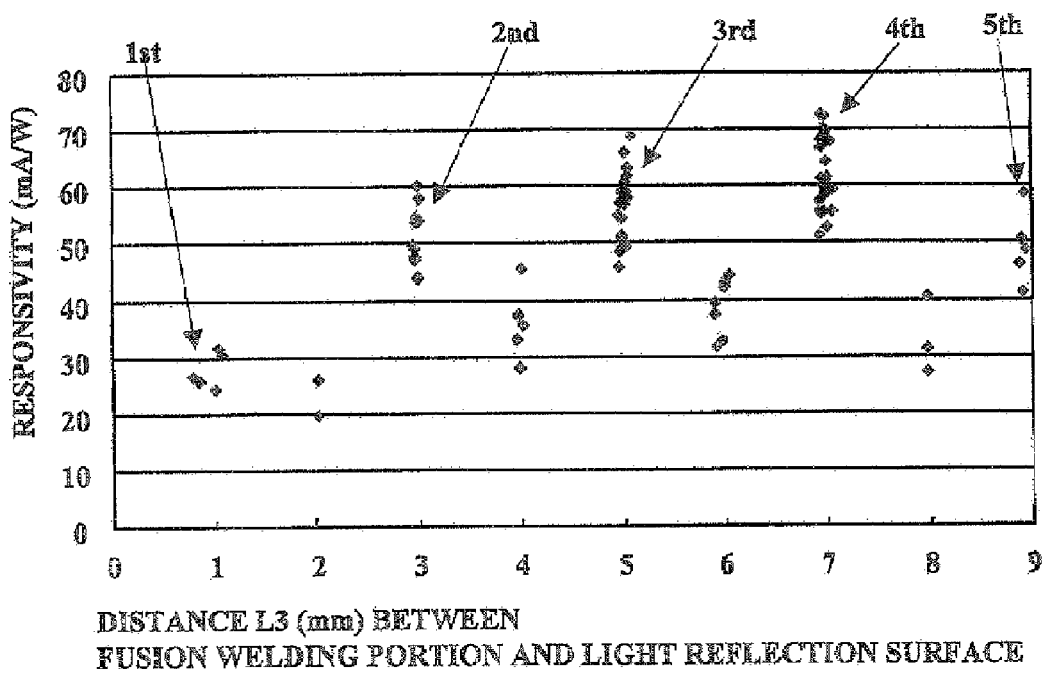
FIG. 5 is a graph showing the relationship between the responsivity and the distance L3 (mm) between the fusion splicing portion and the light reflection surface described with respect to EXAMPLE 2.

FIG. 5 is a graph showing the relationship between the responsivity (mA/W) of the photodiode and the distance L3 (mm) between the fusion splicing portion and the light reflection surface. The responsivity was measured while changing the distance L3 between the fusion splicing portion and the light reflection surface from 0.8 mm to 9.0 mm. The factors other than the distance L3, i.e., the shape (angle), the size of the notch, the light reflecting metal film and so on, were the same as those in EXAMPLE 1. It can be understood that the responsivity was high when the distance L3 between the fusion splicing portion and the light reflection surface was about 1 mm, when the distance was about 3 mm, when the distance was about 5 mm, when the distance was about 7 mm and when the distance was about 9 mm, and that the responsivity was low when the distance was about 2 mm, when the distance was about 4 mm, when the distance was about 6 mm and when the distance was about 8 mm. High-responsivity points correspond to strengthening by interference of light, and low-responsivity points correspond to weakening by interference of light. Light strengthen by primary interference at a distance of about 1 mm. Larger the ordinal number, the higher the responsivity. The highest responsivity was exhibited at third-order and fourth-order positions. It was demonstrated that it was possible to obtain an optical power monitor having high responsivity by using third-order or fourth-order interference light.

EXAMPLE 3

Figure 6:
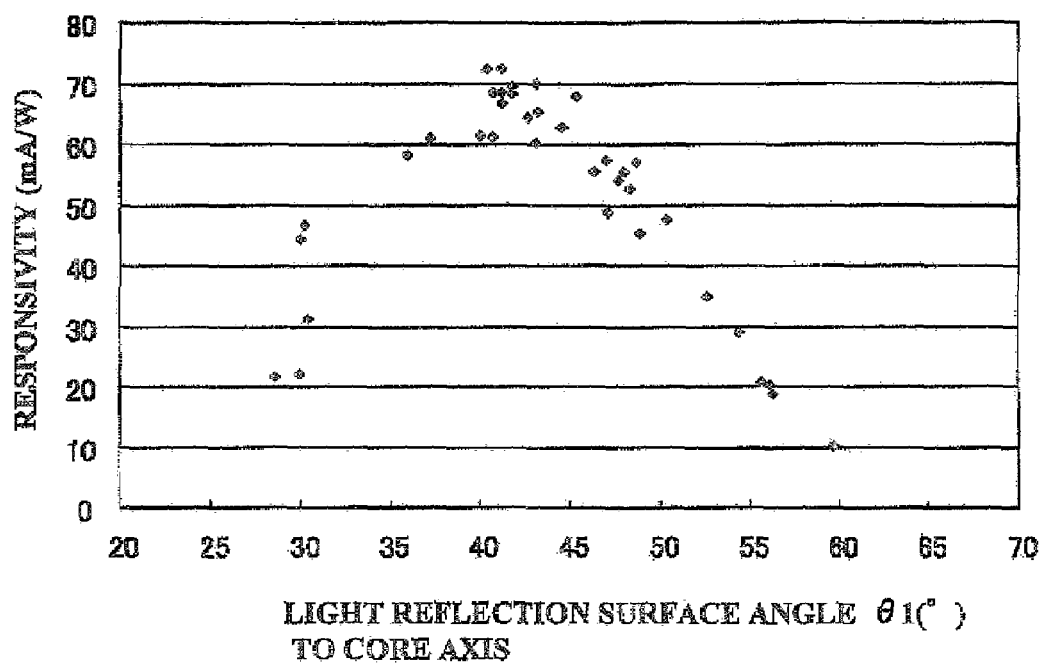
FIG. 6 is a graph showing the relationship between the responsivity and the angle θ1 (°) of the light reflection surface described with respect to EXAMPLE 3.

FIG. 6 is a graph showing the relationship between the responsivity (mA/W) and the angle $\theta 1$ (°) of the light reflection surface to the downstream-side core optical axis. The distance L between the fusion splicing portion and the light reflection surface was fixed at 6.80 mm and fourth-order interference light was used. Optical power monitors were made by changing the angle $\theta 1$ of the light reflection surface from 28° to 60°. The responsivity measuring method, the light reflecting film and so on in EXAMPLE 3 are the same as those in EXAMPLE 1. The responsivity was higher than 60 mA/W when the angle $\theta 1$ was in the range from 38° to 45°, but decreased abruptly when the angle was reduced below 38° and when the angle exceeded 45°. The following is thought to be the cause of the reduction in responsivity. When the angle is smaller than 38°, light is reflected by the light reflection surface but angle at which the reflected light is radiated to the optical fiber periphery is increased. That is, the energy of light reflected by the cladding layer peripheral surface to be returned into the cladding layer is increased. This is thought to be because the light is incident on the cladding layer peripheral surface at an angle larger than 14°. When the angle is larger than 45°, the proportion of light transmitted through the light reflection surface is increased, so that the responsivity is reduced.

EXAMPLE 4

Figure 7:
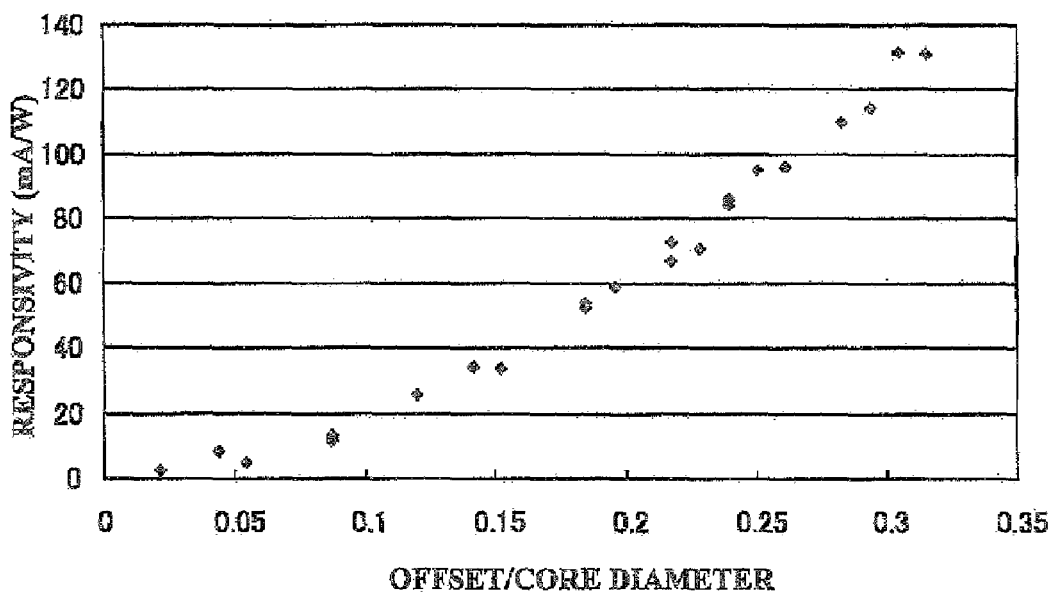
FIG. 7 is a graph showing the relationship between the responsivity and the offset/the core diameter described with respect to EXAMPLE 4.

FIG. 7 is a graph showing the relationship between the responsivity (mA/W) and the offset/the core diameter. Optical power monitors were made with changing the offset/core diameter ratio from 0.02 to 0.32. The responsivity measuring method, the position and angle of the light reflection surface, the light reflecting metal film and so on in EXAMPLE 4 are the same as those in EXAMPLE 1. The responsivity became higher as the offset/the core diameter was increased. When the offset is increased, the energy of light leaked into the downstream-side cladding layer is increased. The energy of light incident on the light reflection surface is thereby increased. As a result, the energy of light entering the photodiode is increased and the responsivity value becomes high. High responsivity means accurate monitoring even when the intensity of light transmitted through the optical fiber is low. However, this means that a high proportion of light in the light transmitted through the optical fiber is extracted. This is disadvantageous in terms of transmission loss.

Figure 8:
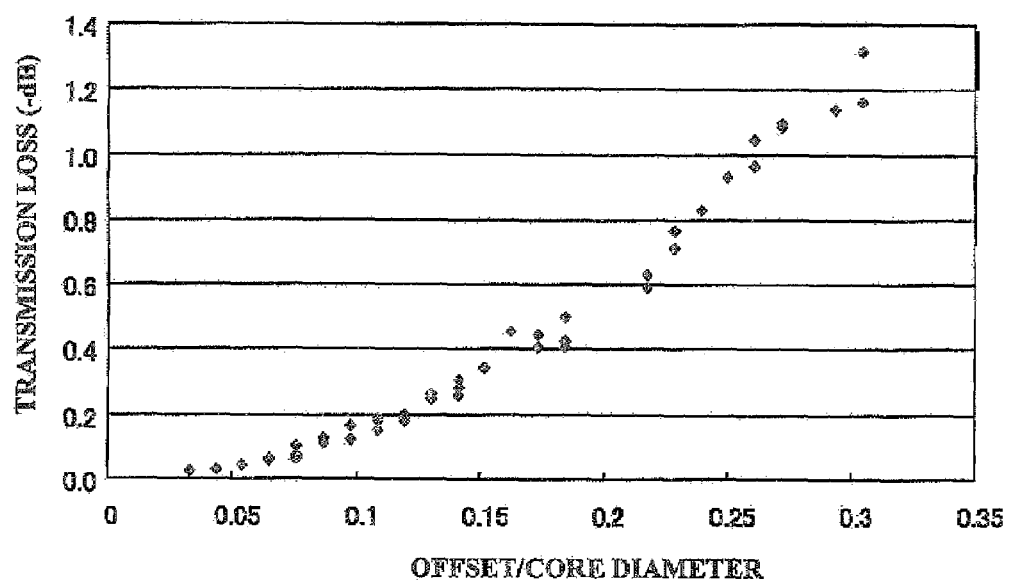
FIG. 8 is a graph showing the relationship between the transmission loss and the offset/the core diameter described with respect to EXAMPLE 4.

FIG. 8 is a graph showing the relationship between the transmission loss (−dB) and the offset/the core diameter. It can be understood that when the offset/core diameter ratio is increased, the transmission loss is increased. This means that the rate at which the intensity of light transmitted through the optical fiber decreases becomes higher. The performance of the optical power monitor is determined from the balance between the responsivity and the transmission loss. A high-performance optical power monitor having a high responsivity and a reduced transmission loss was obtained by setting the offset/the core diameter in the range from 0.05 to 0.32.

EXAMPLE 5

Figure 9:
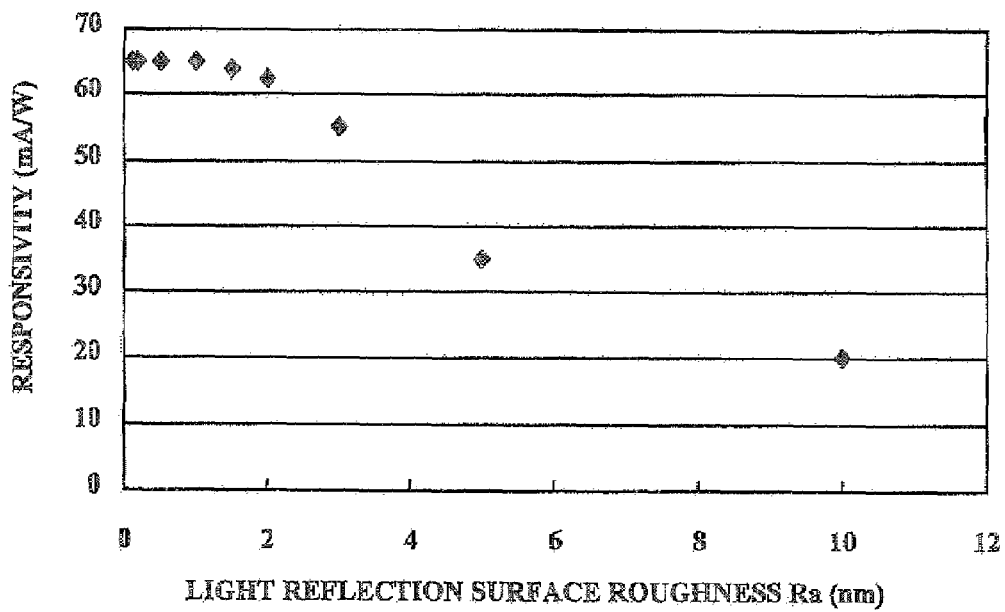
FIG. 9 is a graph showing the relationship between the responsivity and the surface roughness of the light reflection surface described with respect to EXAMPLE 5.

FIG. 9 is a graph showing the relationship between the responsivity (mA/W) and the light reflection surface roughness Ra (nm). Optical power monitors were made by changing the light reflection surface roughness Ra from 0.1 nm to 10.0 nm. The surface roughness was realized by changing the particle size of a diamond grinding wheel. As samples for measuring the surface roughness, optical fibers of the same type as the optical fibers used in the optical power monitors to measure the responsivity were prepared. The sample optical fibers were notched by the same working as that performed on the optical fibers of the optical power monitors and were used by being broken at the notches. The surface roughness Ra was measured with a probe-type surface roughness tester in accordance with JIS B0601. Gold was vacuum deposited as light reflecting film on the two side surfaces of the notch. Light is reflected by the interface between the cladding layer and gold. Therefore diffused reflection can occur easily if the surface roughness is high. It was confirmed that the responsivity decreased abruptly when the surface roughness was increased above 2 nm. This effect is thought to be due to diffused reflection.

EXAMPLE 6

Figure 10:
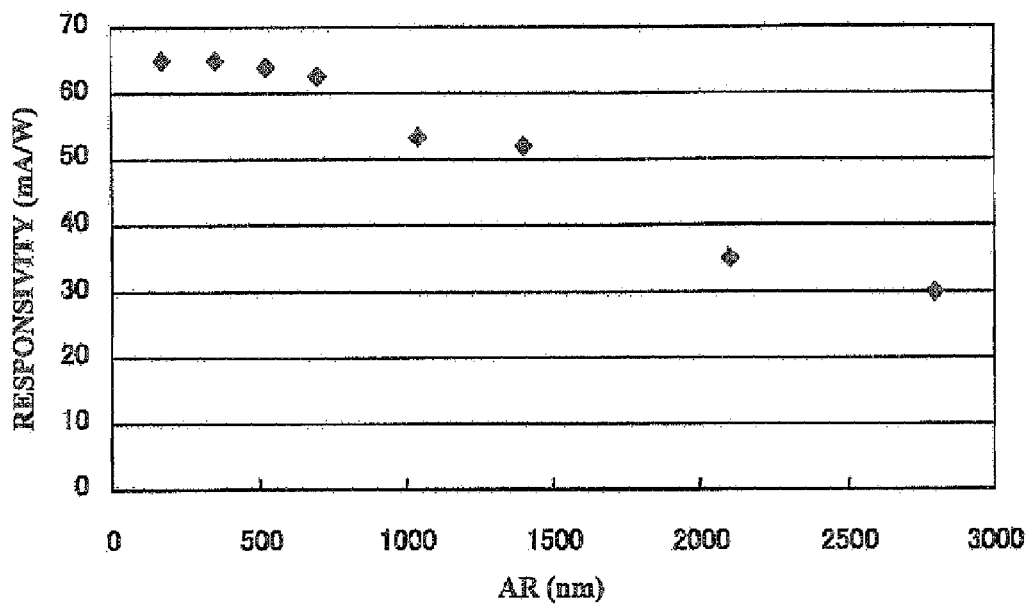
FIG. 10 is a graph showing the relationship between the responsivity and the roughness motif average length AR (nm) obtained from an envelop undulation curve of the light reflection surface, described with respect to EXAMPLE 6.

FIG. 10 is a graph showing the relationship between the responsivity (mA/W) and the roughness motif average length AR (nm) obtained from an envelope undulation curve of the light reflection surface. Optical power monitors were made by changing AR from 100 nm to 2800 nm. The surface roughness Ra was set to 1.2 nm. The other conditions were the same as those in EXAMPLE 1. As samples for measuring the roughness motif average length AR, optical fibers of the same type as the optical fibers used in the optical power monitors to measure the responsivity were prepared. The sample optical fibers were notched by the same working as that performed on the optical fibers of the optical power monitors and were used by being broken at the notches. AR was measured in accordance with JIS B0631. When the roughness motif average length AR is increased, the period of undulation of the light reflection surface becomes closer to the wavelength of light transmitted through the optical fiber so that the responsivity is easily affected by the undulation. A reduction in responsivity due to interference between lights reflected by the light reflection surface was observed. It was confirmed that a roughness motif average length AR of about 800 nm or less was preferable. 800 nm corresponds to about ½ of the wavelength of light used.

EXAMPLE 7

Figure 11:
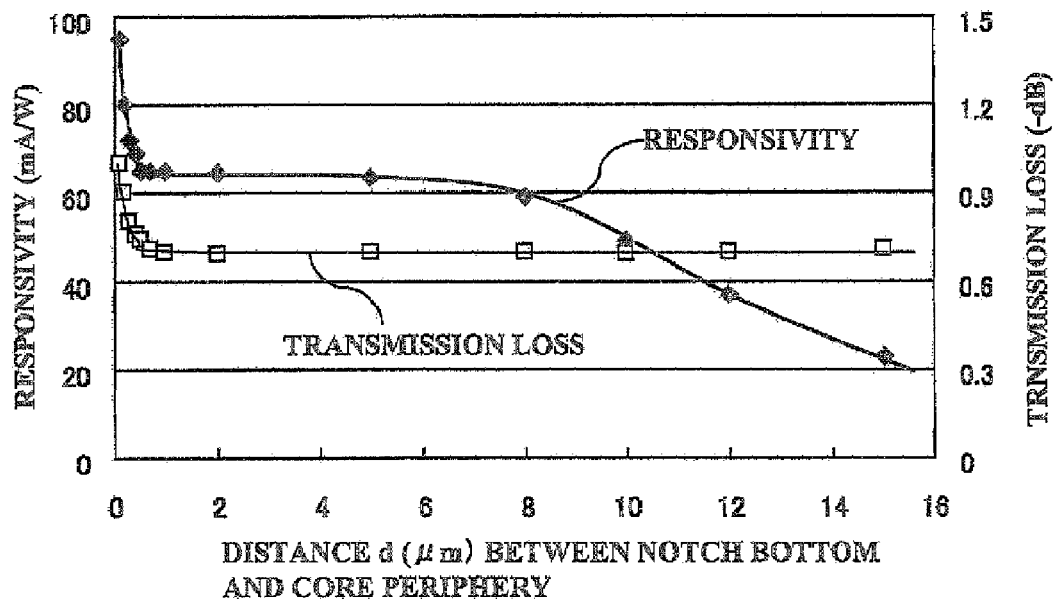
FIG. 11 is a graph showing the relationship between the responsivity and the distance d (μm) between the notch bottom and the core periphery with respect to the transmission loss.

FIG. 11 is a graph showing the relationship between the responsivity (mA/W), the transmission loss (–dB) and the distance d (µm) between the notch bottom and the core periphery. Optical power monitors were made with changing the distance d from 0.2 µm to 15 µm. The conditions other than the distance d were the same as those in EXAMPLE 1. When the distance d is in the range from 0.5 µm to 8 µm, substantially no change responsivity is caused. As the distance d is increased from 8 µm, the responsivity decreases gradually because the area of the light reflection surface is reduced. Conversely, as the distance is reduced from 0.5 µm, the bottom of the notch is brought considerably close to the core. In the optical fiber, light is transmitted mainly through the core. In actuality, however, some energy of light is leaked into the cladding layer in the vicinity of the core. This leaked light is reflected by the notch side surface to be monitored. Therefore, when the distance d is smaller than 0.5 µm, the responsivity is increased but the transmission loss is also increased. It was demonstrated that a stable optical power monitor having reduced variations in responsivity and transmission loss was obtained when the distance d was in the range from 0.5 µm to 8 µm.

EXAMPLE 8

Figure 12A:
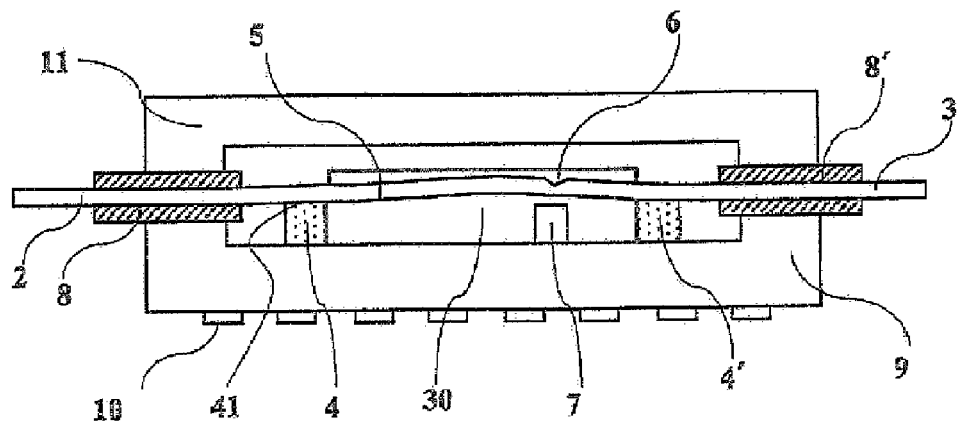
FIG. 12A is a longitudinal sectional view of an optical power monitor according to EXAMPLE 8 of the present invention.

FIG. 12A is a longitudinal sectional view of an optical power monitor according to EXAMPLE 8 of the present invention. The light transmission upstream-side optical fiber 2 and the light transmission downstream-side optical fiber 3 are placed along V-sloped grooves 41 in the first and second support blocks 4 and 4' and fixed therein with a resin. The support blocks 4 and 4' are placed so that their ascending slopes are opposed to each other. Therefore the two optical fibers 2 and 3 are lifted at about a mid point between the fusion splicing portion and the notch, existing between the support blocks 4 and 4', to have an upward arc like shape.

Figure 12B:
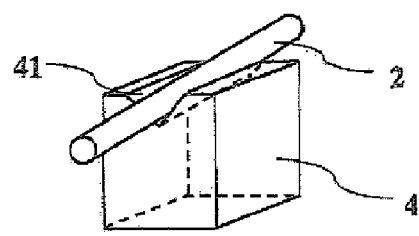
FIGS. 12B and 12C are perspective views of first support blocks used in the optical power monitor.
Figure 12C:
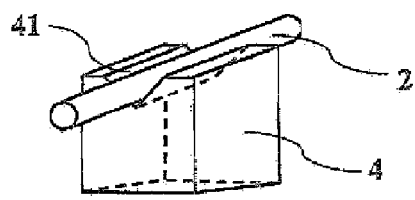

Each of FIGS. 12B and 12C shows a state in which the upstream-side optical fiber 2 is held on the first support block 4. Referring to FIG. 12B, the V-groove 41 was formed by being inclined through 0.14° with respect to the bottom surface of the support block. The depth of the V-groove 41 is such that the optical fiber 2 protrudes by 4 µm beyond the upper surface of the support block when the optical fiber is placed in the groove. The optical fiber was placed along this V-groove 41 and fixed in the same by bonding, thus enabling the optical fiber to be formed into the shape of the upward arc. Referring to FIG. 12C, the V-groove 41 parallel to the upper surface of the support block 4 was formed and the bottom surface of the support block was thereafter ground at an angle of 0.14° with respect to the upper surface. It was possible to use in the optical power monitor of the present invention each of the support blocks shown in FIGS. 12B and 12C. The support block was formed by machining a quartz block.

Figure 13:
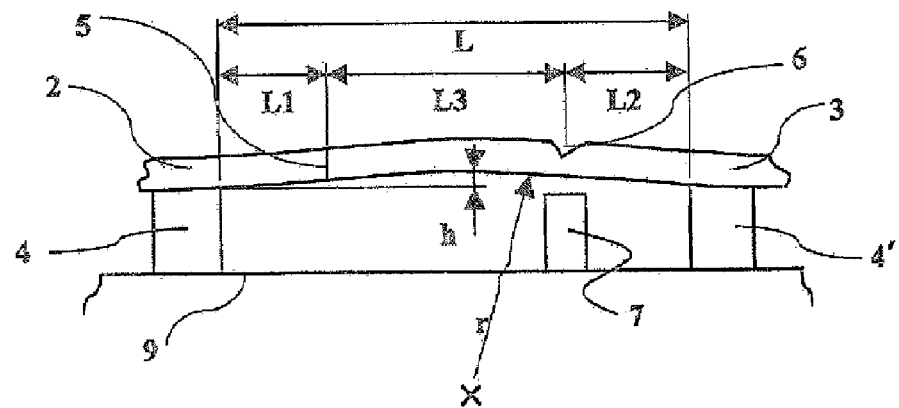
FIG. 13 is a diagram for explaining the size of the optical fibers between support blocks in EXAMPLE 8.

The size of each portion of the optical power monitor in EXAMPLE 8 shown in FIG. 12A will be described with reference to FIG. 13. The distance L between the support blocks 4 and 4' was 8 mm. The distance L1 between the first support block 4 and the fusion splicing portion 5 was 1.5 mm, and the distance L2 between the notch 6 and the second support block 4' was 1.5 mm. The distance L3 between the fusion splicing portion 5 and the notch 6 was 5 mm. The distance L between the inner surfaces of the first and second blocks 4 and 4' is L1+L3+L2. From the distance (the length of the chord of the arc) L between the first and second support blocks and the lift h of the optical fiber, the curvature radius r of the two optical fibers on the upstream and downstream sides can be obtained by $r=h/2+L^2/8h$. Since the lift h is sufficiently small in comparison with L, approximate calculation by $r=L^2/8h$ can be performed. The lift h of the two optical fibers 2 and 3 at the mid point between the support blocks was 93 µm, and the curvature radius r of the optical fiber was 0.086 m.

Fifty 8-channel optical power monitors according to this example of the present invention were used to obtain the responsivity of four hundred optical power monitors. The obtained responsivities were 62.3 mA/W to 78.5 mA/V and the average of them was 74.0 mA/W. An optical power monitor having a good responsivity and a restricted responsivity variation range of 16.2 mA/W was obtained. The responsivity was improved by 13.5% on average in comparison with the conventional optical power monitor, and the range of variation in responsivity was reduced to half that of the conventional monitor.

EXAMPLE 9

Figure 14:
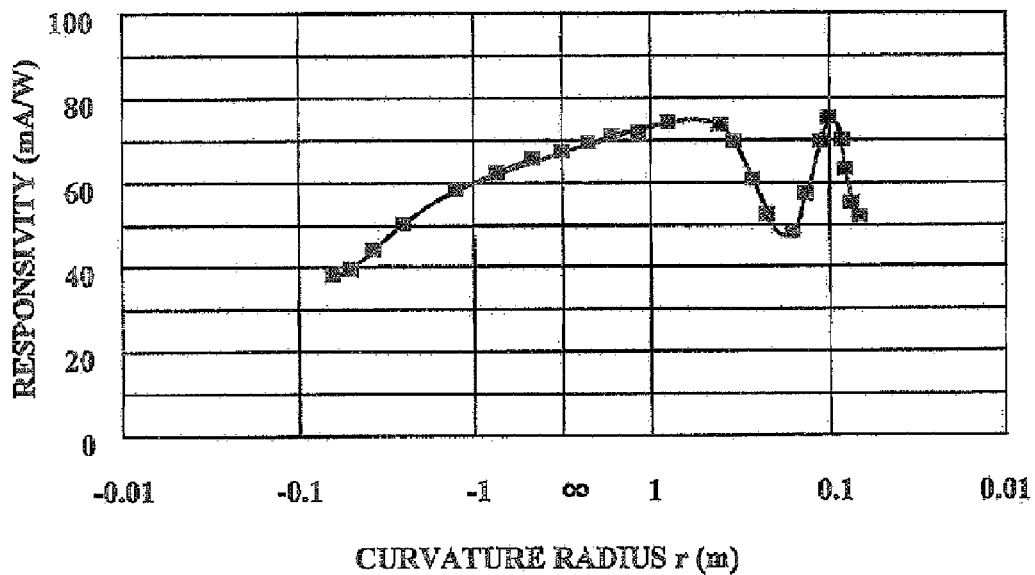
FIG. 14 is a graph showing the relationship between the responsivity and the curvature radius r (m) in EXAMPLE 9 of the present invention.

FIG. 14 is a graph showing the relationship between the responsivity (mA/W) and the curvature radius r (m) of the optical fiber. Optical power monitor having the same sizes L1 to L3 as those in EXAMPLE 1, using V-grooves sloped at various angles and having the curvature radius of the portions of the two optical fibers between the support blocks changed from –0.16 m of a downward arc to +0.067 m of an upward arc were used. The curvature radius ∞ in FIG. 14 corresponds to the state where the two optical fibers are parallel to each other. The abscissa of the graph represents the curvature radius in a logarithmic scale bilaterally about the ∞ point. A negative curvature radius represents a downward arc, while a positive curvature radius represents an upward arc. The responsivity at the curvature radius ∞ point corresponding to the parallel state of the two optical fibers is 68 mA/W. As the absolute value of the curvature radius of a downward arc was reduced, the responsivity decreased. When the curvature radius was –0.16 m, the responsivity was reduced to a value smaller than 40 mA/W. From this result, it can be understood that the responsivity cannot be increased in the case of forming a downward arc. On the other hand, as the curvature radius of an upward arc was reduced, the responsivity increased. A responsivity of 70 mA/W or more was obtained in the range of curvature radius from +2.667 m to +0.347 m. As the curvature radius was further reduced, the responsivity decreased temporarily, had a minimum value at +0.16 m and again had a maximum value of 75 mA/W at +0.10 m. The curvature radius at which a responsivity of 70 mA/W or higher was in the vicinity of +0.10 m was in the range from +0.111 m to +0.086 m. Also from this result, it was demonstrated that it was possible to obtain a responsivity of 70 mA/W or higher by forming the optical fiber into the shape of an upward arc and setting the curvature radius in the range from +2.667 m to +0.347 m or in the range from +0.111 m to +0.086 m.

EXAMPLE 10

Figure 15:
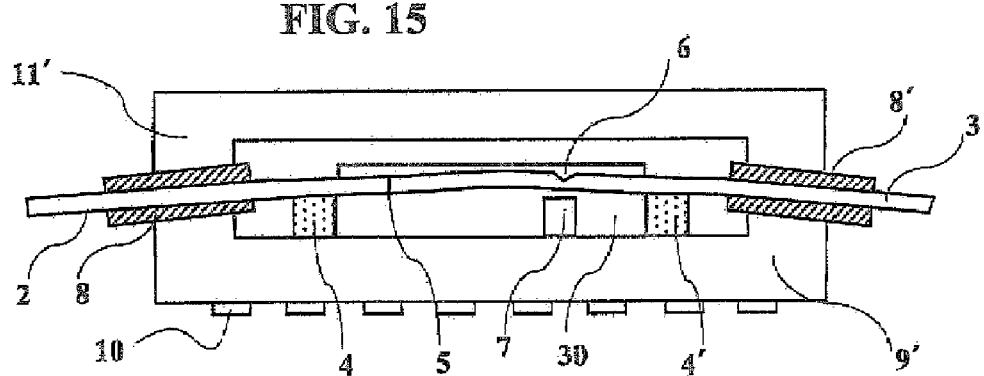
FIG. 15 is a longitudinal sectional view of an optical power monitor in EXAMPLE 10 of the present invention.

FIG. 15 shows a longitudinal sectional view of an optical power monitor in EXAMPLE 10 of the present invention in which optical fibers are fixed on a frame of a case and formed into the shape of an upward arc. Slopes of 1° were formed on a frame of a case 9' and optical fibers 2 and 3 inserted in protective tubes 8 and 8' were fixed on the slopes with an adhesive. V-grooves in support blocks 4 and 4' were formed mainly for the purpose of preventing the optical fibers from being laterally shifted and, therefore, had no slope. The two support blocks and the two optical fibers were not fixed to each other. Therefore the two optical fibers were formed into the shape of an upward arc continuously through the entire interior of the case 9' as well as between the two support blocks. The curvature radii of fabricated optical power monitors obtained between the support blocks were 1.212 m, 0.552 m and 0.098 m. The responsivities associated with the curvature radii were 71.3 mA/W, 75.2 mA/W and 74.3 mA/W, well matching the values shown in the graph of FIG. 14 with respect to EXAMPLE 9. Thus, the effectiveness of forming optical fibers into the shape of an upward arc by fixing the optical fibers on a frame portion of a case was confirmed.

EXAMPLE 11

Figure 16:
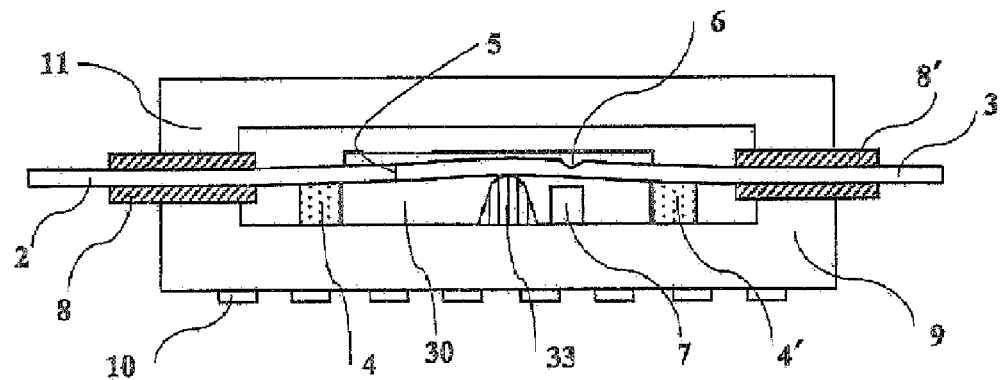
FIG. 16 is a longitudinal sectional view of an optical power monitor in EXAMPLE 11 of the present invention.

FIG. 16 shows a longitudinal sectional view of an optical power monitor in EXAMPLE 11 of the present invention in which portions of two optical fibers between first and second blocks are formed into the shape of an upward arc by using a third support block. The first and second support blocks 4 and 4' and the third support block 33 are fixed on an inner bottom surface of a case 9 with adhesive. The support blocks 4 and 4' have V-grooves but are provided with no slope. The height of the third support block 33 was adjusted so that the optical fibers were lifted by 9 μm at a center between the two support blocks 4 and 4' in a state where two optical fibers 2 and 3 were placed along the V-grooves. The upstream-side and downstream-side optical fibers 2 and 3 are fixed with adhesive so as to extend along the V-grooves in the first and second blocks 4 and 4'. The third support block 33 was made of quartz having the same thermal expansion coefficient as that of the optical fibers. The extreme end of the third support block 33 to be brought into contact with the optical fiber was formed as a curved surface having a radius of 1 mm. Only the portions of the optical fibers between the first and second blocks were formed into the shape of an upward arc, and the distance between the first and second blocks was set to 8 mm. The curvature radius of the corresponding portions of the optical fibers was thereby set to 0.89 m. The responsivity was 73.2 mA/w, well matching the value shown in the graph in FIG. 14 with respect to EXAMPLE 9.

Since only the portions of the two optical fibers between the two support blocks are formed into the shape of an upward arc, the probability of the optical fiber being broken at the notch 6 is increased if the curvature radius is excessively reduced. The curvature radius at which the optical fiber was broken was obtained by changing the distance between the first and second support blocks from 4 to 20 mm. The obtained curvature radius was 0.15 m to 0.25 m. It was found that in this example of the present invention an optical fiber having the shape of an upward arc with a curvature radius of 2.667 m to 0.347 m at which a responsivity of 70 mA/W or more can be obtained can be made but an optical fiber having the shape of an upward arc with a curvature radius of 0.111 m to 0.086 m cannot be made. However, changes in the upward arc peak position can be reduced to reduce variations in responsivity thought to be due to the upward arc peak position. Therefore this arrangement is effective when the curvature radius is large.

EXAMPLE 12

To examine variations in responsivity among optical power monitors having optical fibers of the same curvature radius, fifty to sixty 8-channel optical power monitor assemblies were fabricated with respect to each of different curvature radii under the conditions in EXAMPLE 8 and the responsivities of the monitors were measured. Four hundred to four hundred and eighty optical power monitors were measured with respect to each curvature radius. The number of curvature radii used in measurement is twelve. As shown in TABLE 1, the curvature radius was changed from −1.6 m of a downward arc to +8.1 m of an upward arc. The curvature radius of a downward arc is represented by a negative value, while the curvature radius of an upward arc is represented by a positive value. For comparison, two hundred conventional optical power monitors were also provided and tested and 1600 measured values were entered as a sample group M. The curvature radii of the conventional articles were in a distribution from −0.3 m of a downward arc to +0.3 m of an upward arc.

In TABLE 1, the results of measurement of the responsivity are shown in minimum values, maximum values, averages and the differences between the maximum and minimum values. Sample groups A and B have optical fibers in downward arc form; a sample group C has flat optical fibers with a curvature radius ∞; sample groups D to L have optical fibers in upward arc form; and the sample group M is conventional articles. The curvature radius of each sample group is not a measured value but a design value. However, several samples were actually measured to confirm matching between the measured value and the design value. Those having an average responsivity exceeding 70 mA/W were in the sample groups E, F, G, I and J and their curvature radii were 1.600 m, 0.800 m, 0.400 m, 0.100 m and 0.086 m. In EXAMPLE 9, the curvature radii for an average responsivity exceeding 70 mA/W were 2.667 m to 0.347 m or 0.111 m to 0.086 m. The values of the sample groups E, F, G, I and J were included in these ranges. The range of variation in responsivity of these sample groups was 14.6 mA/W to 16.2 mA/W, half that of the conventional articles. In the sample group H having a curvature radius of 0.267 m out of this range, the responsivity even at the maximum was lower than 70 mA/W, The conventional article sample group M had the range of curvature radius including those of the sample groups A to G. The sample groups A to G having the minimum and maximum of the curvature radii within this range had a minimum responsivity of 46.5 mA/W and a maximum responsivity of 81.4 mA/W. A good match is recognized between these responsivities and a minimum value of 46.5 mA/W and a maximum responsivity of 79.5 mA/W of the conventional articles.

TABLE 1

| Specimen Group | Arc-like shape | | Responsivity (mA/W) | | | Range (Max. − Min.) |
| --- | --- | --- | --- | --- | --- | --- |
| | Arc | Curvature radius (m) | Min. | Max. | Avg. | |
| A | Downward | −1.600 | 46.5 | 79.1 | 62.9 | 32.6 |
| B | Downward | −6.500 | 51.2 | 78.8 | 65.8 | 27.6 |
| C | Flat | ∞ | 54.1 | 79.4 | 66.9 | 25.3 |
| D | Upward | +8.100 | 61.3 | 79.5 | 69.1 | 18.2 |
| E | Upward | +1.600 | 64.1 | 79.5 | 72.0 | 15.4 |
| F | Upward | +0.800 | 66.8 | 81.4 | 74.1 | 14.6 |
| G | Upward | +0.400 | 65.9 | 81.2 | 73.5 | 15.3 |
| H | Upward | +0.267 | 52.9 | 68.7 | 60.7 | 15.8 |
| I | Upward | +0.100 | 66.7 | 82.3 | 74.6 | 15.6 |
| J | Upward | +0.086 | 62.3 | 78.5 | 74.0 | 16.2 |
| K | Upward | +0.080 | 53.3 | 72.5 | 62.8 | 19.2 |
| L | Upward | +0.067 | 43.4 | 60.8 | 51.7 | 17.4 |
| M | Conventional | | 46.5 | 79.5 | 65.2 | 33.0 |

An average responsivity of 70 mA/W or higher can be obtained by forming the optical fibers between the two support blocks into the shape of an upward arc having a curvature radius of 2.667 m to 0.347 m or 0.111 m to 0.086 m. The range of variation in responsivity can also be reduced to half that of the conventional articles.

What is claimed is:

1. An optical power monitor comprising:
   two optical fibers, each having a core in its center and a cladding layer around the core, which are disposed on an upstream side and on a downstream side of a light transmission direction, respectively, and which end surfaces face and are fusion-spliced to each other at a fusion splicing portion with their core optical axes offset from each other;
   a light reflection surface disposed in the cladding layer of the downstream-side optical fiber, facing part of the end surface of the upstream-side optical fiber core, which is offset and protrudes from the end surface of the downstream-side optical fiber core at the fusion splicing portion, and being at an angle of 38° to 45° with the core optical axis of the downstream-side optical fiber; and
   a photo-diode disposed opposite to the light reflection surface with respect to the downstream-side optical fiber core to detect lights that are transmitted through the upstream-side optical fiber core, leaked into the cladding layer of the downstream-side optical fiber from the part of the end surface of the upstream-side optical fiber core offset and protruding from the end surface of the downstream-side optical fiber core, and reflected by the light reflection surface,
   wherein the light reflection surface is located at a position, that the lights leaked into the cladding layer of the downstream-side optical fiber from the part of the end surface of the upstream-side optical fiber core interfere and strengthen each other, and at a distance of 4.5 mm to 7.5 mm from the fusion splicing portion, and
   wherein the optical fibers are curved in an arc-like shape, having a curvature radius of 0.85 m to 0.111 m or 0.347 m to 2.667 m, to rise in a direction opposite to the photo-diode and to have a peak of the arc-like shape substantially at a mid-point between the fusion splicing portion and the light reflection surface.

2. An optical power monitor as set forth in claim 1, wherein the offset between the core optical axes of the two optical fibers is 0.05 times to 0.32 times a core diameter of the optical fibers.

* * * * *